April 17, 1951 C. R. PATON 2,549,125
TRANSMISSION
Filed June 5, 1946 2 Sheets-Sheet 1

LOW

LOW COAST

INTERMEDIATE

CLYDE R. PATON
*INVENTOR.*

BY
C. C. McRae
R. D. Harris
J. R. Faulkner
T. H. Oster

ATTORNEYS.

April 17, 1951 C. R. PATON 2,549,125
TRANSMISSION
Filed June 5, 1946 2 Sheets-Sheet 2
HIGH
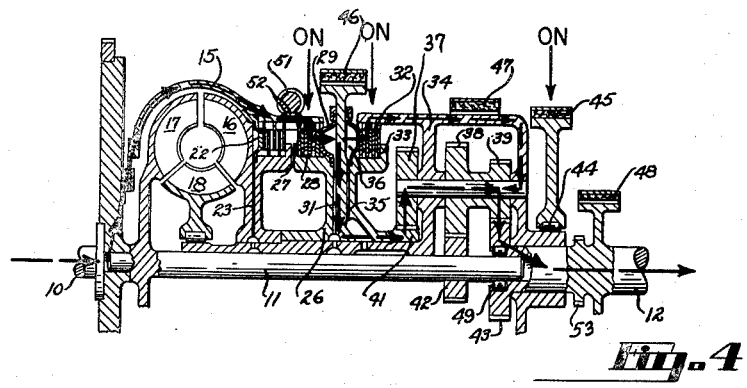
REVERSE
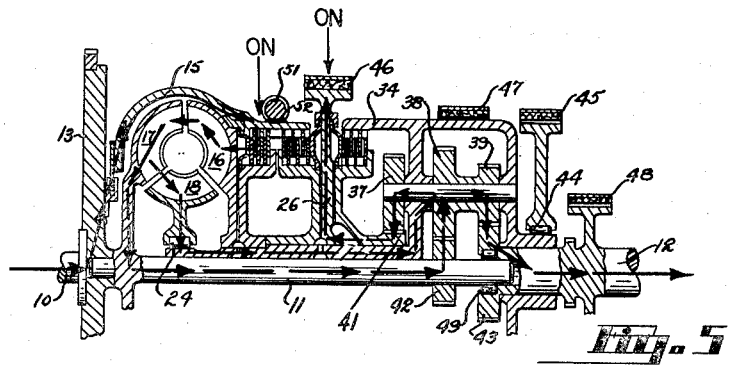
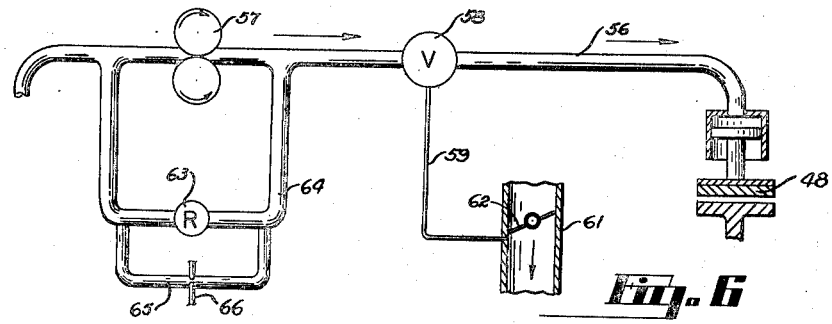
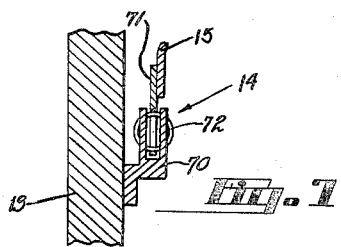
CLYDE R. PATON
INVENTOR.
BY
ATTORNEYS.

Patented Apr. 17, 1951

2,549,125

UNITED STATES PATENT OFFICE 2,549,125

TRANSMISSION

Clyde R. Paton, Bloomfield Village, Mich., assignor to Ford Motor Company, Dearborn, Mich., a corporation of Delaware Application June 5, 1946, Serial No. 674,501

3 Claims. (Cl. 74—732)

This invention relates to improvements in transmissions for automotive vehicles.

The invention contemplates the provision of a transmission particularly suitable for automatic operation, and including a torque converter and a multiple planetary gearing system adapted to transmit torque at different speed ratios. A primary object of the invention is to provide a transmission having a torque converter operating in combination with a low speed gear reduction, and having intermediate and high speed gear ratios transmitting torque independently of the torque converter. With this arrangement the continuously variable range of the torque converter is combined with a fixed gear reduction to result in a low speed range. In effect, therefore, the transmission covers the equivalent of a four speed range since the continuously variable low speed range can be considered the equivalent of two different low speed ratios.

A further object of the invention is to provide a transmission in which a torque converter is used only in low and reverse, being released in intermediate and high speed ratios by means of a clutch. Smooth, fluid starting is thus available in low and reverse, with accompanying shock-free acceleration, and the most efficient operating range of the converter is utilized. By locking out the converter in intermediate and high speed, greater efficiency is obtained since the efficiency of a torque converter drops rapidly at higher transmission speeds. Smoothness of operation is also obtained in intermediate and high since a cushion drive member is incorporated between the drive shaft and the transmission gearing. The advantage of a fluid drive is thus secured in low, and the greater fuel economy of a mechanical drive is obtained in intermediate and high speeds. A further advantage of this arrangement is that since the torque converter is used only in low it is not necessary to obtain the maximum efficiency from the converter, and accordingly its design can be modified to enable its cost to be reduced. This slight sacrifice of efficiency in low is not serious, and the principal disadvantage of the converter is overcome, namely the high cost of manufacture thereof.

Still another object of the invention is to provide a transmission adapted for automatic operation and in which free wheeling is eliminated in all speed ratios. Engine stalling is thus eliminated, removing the danger that is frequently present in free wheeling transmissions due to the operator not being aware that the engine has stalled until he tries to again use the engine, possibly under emergency circumstances. In addition, vehicle control on ice is improved since the engine can be safely used as a brake since the car will coast at direct drive ratio through the torque converter in the normal operating ranges.

A still further object is to provide a transmission of the type mentioned above in which a minimum number of "timed" shifts are required. In many automatic transmissions a number of timed shifts must take place, requiring precise controls to insure a smooth transition when one clutch is released and another simultaneously engaged. In the present construction timing difficulties are avoided by providing a construction in which a time interval or lag can be permitted between the actuation of successively engaged clutches.

Yet another object of the invention is to provide a transmission in which the tendency of the vehicle to creep during idling is minimized and in part cancelled by the particular arrangement of clutches, and any remaining tendency to creep is then wholly eliminated by an anti-creep brake. The anti-creep brake is designed to automatically vary the force of the brake application in accordance with operating conditions. For example, the brake is automatically applied with less pressure when the fluid is warm and the engine is idling at a low speed; and with a higher pressure when the fluid is cold and the engine is idling at a higher speed as for example when starting a cold engine.

Other objects of the invention include the provision of a transmission having two optional downhill or mountain brake gear ratios, and which is particularly adapted for control by conventional hydraulic control mechanisms operable either automatically or by a single gear selector lever. Inasmuch as there need be no control mechanism operated directly by the accelerator, the possibility of accelerator fatigue is eliminated since the accelerator is free from an increase in frictional characteristics or return spring tension.

Numerous other advantages of the present invention will be made more apparent as this description proceeds, particularly when considered in connection with the accompanying drawings, in which:

Figures 3, 4 and 5 are views similar to Figure 2 but illustrating the power flow through the transmission in intermediate, high and reverse speed ratios respectively.

Figure 6 is a diagrammatic view illustrating the controls for the anti-creep brake.

Figure 7 is an enlarged cross sectional view of the cushion drive member.

Figure 1:
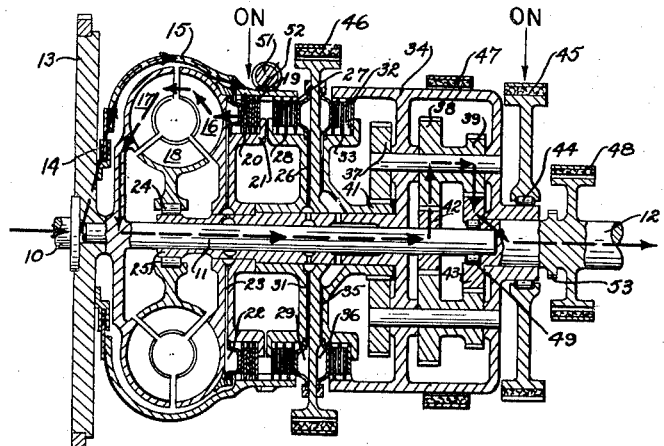
Figure 1 is a semi-diagrammatical cross sectional view through a transmission embodying the present invention, and particularly illustrates the power flow therethrough in the low speed range.

Referring now particularly to the drawings, there is shown a transmission having a drive shaft 10 adapted to be connected to the engine crankshaft, a main shaft 11, and a load shaft 12 adapted to be connected to the rear axle drive means of the vehicle. The drive shaft 10 is connected to the conventional flywheel 13 which in turn is connected by a cushioned spring drive assembly 14 to an annular housing 15. A torque converter of conventional construction is contained within the annular housing 15 and comprises a pump or impeller 16, a turbine 17 and a reactor 18. The impeller 16 of the torque converter is adapted to be selectively coupled to the annular housing 15 by means of a low speed clutch comprising a series of annular friction discs 19 splined to the housing 15 and a series of annular friction discs 20 splined to an annular flange 21 extending outwardly from the impeller 16. The friction discs 19 and 20 are adapted to be engaged with each other by means of an expansible fluid chamber 22 which communicates through a conduit 23 with a suitable source of fluid pressure (not shown). The turbine 17 is mounted directly upon the main shaft 11 for rotation therewith, and the reactor 18 is connected through an overrunning clutch 24 to the hub 25 of a planet carrier, to be described more in detail later.

The annular housing 15 is also adapted to be selectively connected to the clutch carrier 26 by means of an intermediate speed clutch comprising a series of friction discs 27 and 28 splined to the housing 15 and the clutch carrier 26 respectively and actuated by an expansible fluid chamber 29, the latter being connected by a conduit 31 to a source of fluid pressure. A third friction clutch, known as the high speed clutch, and comprising a series of friction discs 32 and 33 splined to a planet carrier 34 and the clutch carrier 26 respectively and actuated by fluid pressure supplied through a conduit 35 to an expansible fluid chamber 36, selectively locks the clutch carrier and planet carrier together.

The planet carrier 34 is mounted for rotation about the axis of the main shaft 11 and carries clusters of planet pinions 37, 38 and 39. Pinions 37 mesh with a sun gear 41 carried by the clutch carrier 26. Pinions 38 mesh with a sun gear 42 mounted upon the main shaft 11, and pinions 39 mesh with a sun gear 43, the latter being carried by the load shaft 12. In order to transmit torque through the multiple planetary gearing system in the forward direction, an overrunning clutch 44 is connected to the planet carrier 34. The overrunning clutch is adapted to be selectively connected to the transmission casing by means of a forward speed brake 45.

To afford the proper control to the transmission, additional brakes are provided, including a reverse speed brake 46 adapted to lock the clutch carrier 26 against rotation, a lock-up or downhill brake 47 adapted to lock the planet carrier 34 against rotation and which is used both for intermediate speed and also for low speed lock-up operation, and an anti-creep brake 48 arranged to lock the load shaft 12 against rotation during idling to prevent creep.

It will be noted that the drive shaft 10, main shaft 11 and load shaft 12 are co-axially arranged, and that an overrunning clutch 49 is provided between the main shaft and the load shaft to permit the main shaft to overrun the load shaft in the forward drive direction.

Fluid power for the hydraulic control of the transmission may be provided by a pair of fluid pumps (not shown) which may be respectively driven from a front pump drive pinion 51 by a gear 52 provided on the periphery of the annular housing 15 and from a rear drive pinion 53 formed integrally with the load shaft 12.

Figure 7 illustrates with greater clarity the cushioned spring drive assembly 14 which comprises an annular drive member 70 mounted on the flywheel 13, an annular driven member 71 connected to the housing 15, and a plurality of angularly spaced coil springs 72 between the drive and driven members to cushion shocks received from the engine. A smooth power flow is thus possible even when the torque converter is cut out, as in intermediate and high speeds.

In the present application the actuating and controlling means for the various clutches and brakes are not shown, but it will be understood that suitable hydraulic actuating means may be employed to control the engaging speeds and sequence of application of the various clutches and brakes. For example, the basic control may comprise a speed responsive governor valve of the type disclosed in the copending application of Eugene J. Farkas, Serial No. 611,975, filed August 22, 1945, now Patent #2,528,584, November 7, 1950, entitled "Automatic Transmission." This construction comprises a sleeve valve arranged concentrically with the main shaft of the transmission and moved axially against the action of a spring by a centrifugal governor. As the speed increases, the governor weights are thrown radially outwardly, resulting in moving the sleeve valve between positions establishing communication from a fluid pump to suitable hydraulic actuating means for the clutches and brakes to automatically shift the transmission between various speed ratios.

An additional portion of the contemplated control system includes means for modulating the oil pressure, such as disclosed in the copending application of Eugene J. Farkas et al., Serial No. 626,562, filed November 3, 1945, now patent #2,528,585, November 7, 1950, entitled "Oil Pressure Control for Automatic Transmission." The latter construction includes a pressure relief valve employed in connection with the fluid pump and modulated by an expansible vacuum chamber connected with the engine manifold to automatically obtain a variable fluid pressure reaching a maximum under full load and progressively decreasing as the load or torque decreases. Oil pressure is thus furnished to the hydraulic actuating means for the various clutches in accordance with torque requirements. For example, when the transmission clutches are operating under full torque, the maximum oil pressure is required and is furnished; whereas when the load or torque decreases the full pressure is not needed to operate the clutches, and is, in fact, undesirable. With these lower clutch torque requirements, a lower oil pressure is automatically furbe used as a brake. In low speed, as previously described, the overrunning clutch 49 enables the load shaft 12 to drive the engine in direct drive during coasting to prevent stalling and skidding. For downhill or mountain braking, conventional manually operated controls, such as a selector lever upon the steering column, may be provided to selectively lock the transmission in either low or intermediate speed as desired. To lock the transmission in low, the downhill brake 47 is applied with the low speed clutch in engagement. To lock the transmission in intermediate speed the downhill brake 47 is applied with the intermediate speed clutch in engagement.

All transmissions which incorporate either a torque converter or a fluid coupling have a tendency to creep at idling speeds due to the torque transmitted through the fluid member. In the present transmission this creep tendency is minimized by the particular clutch arrangement. When the transmission is in neutral and the engine is idling, the impeller 16 of the torque converter is disconnected from the drive housing 15 since the low speed clutch 19, 20 is disengaged. Thus, the only creep tendency under these conditions results from the frictional drag between the friction discs in the clutches, and this is partially neutralized since while the frictional drag through the low and intermediate speed clutches is in the forward direction, the frictional drag through the high speed clutch is in the reverse direction. This reverse drag results from a backward rotation of the reactor 18 which is permitted since the forward speed brake 45 is disengaged and the planet carrier 34 is free to rotate backwardly as well as forwardly. The backward rotation of the reactor 18 is transmitted through the overrunning clutch 24 to the planet carrier 34 and through the high speed clutch and the planetary gearing to the load shaft 12.

If, however, the low speed clutch 19, 20 and the forward speed brake 45 are held applied during idling speeds, torque is transmitted through the torque converter and the drag on the load shaft 12 is greater. To positively prevent any creep during idling, the anti-creep brake 48 on the load shaft 12 is engaged during idling speeds. With particular reference to Figure 6, it will be noted that fluid pressure for operating the anti-creep brake 48 is supplied through a conduit 56 from a fluid pump 57, the latter being driven from the front pump drive pinion 51 shown in Figure 1. The flow of fluid through the conduit 56 is controlled by a valve 58, which is arranged to be opened by the application of vacuum. The valve 58 is connected by a vacuum line 59 to the carburetor 61 of the engine adjacent the intake manifold side of the throttle valve 62 in its closed position, so that when the throttle is closed during idling the vacuum supply to the valve 58 will be sufficient to actuate the valve and open the conduit 56, thus operating the anti-creep brake. When the engine is accelerated, however, the throttle valve 62 is opened and the vacuum through the line 59 decreases to an amount insufficient to hold the valve 58 open, thus closing the valve and releasing the anti-creep brake.

Provision is also made for automatically varying the force of the anti-creep brake application in accordance with operating conditions. There is more of a tendency for the vehicle to creep when the fluid in the torque converter is cold and the engine is idling fast than when the fluid is warm and the engine is idling slow. A greater braking pressure upon the anti-creep brake is therefore necessary during cold-high idle conditions. If, however, sufficient braking pressure is provided to accommodate the maximum drag or creep to be encountered, the braking will be considerably more than is necessary during the light drag which results when the fluid is warm and the engine is idling slow, and the brake application will be jerky and noticeable to the occupants of the vehicle. It will be noted in Figure 6 that a relief valve 63 is provided in a branch conduit 64 for limiting the pressure in the conduit 56 to the relief valve setting. A bypass conduit 65 of relatively small diameter is provided around the relief valve 63. When the fluid is warm sufficient fluid will flow through the bypass conduit to lower the fluid pressure below the relief valve setting and to thus decrease the braking action during warm-low idle conditions. When the fluid is cold, however, the bypass conduit 66, being small, does not permit sufficient fluid to bypass the relief valve to lower the fluid pressure below the relief valve setting. Thus two values of fluid pressure are available, namely, first, the pressure of the relief valve setting as a maximum pressure for cold-high idle conditions, and second, a reduced pressure for warm-slow idle conditions. If desired, an adjustable orifice 66 may be provided in the bypass conduit to obtain the variation in the fluid pressure necessary to effect the desired braking pressure under the various conditions to be encountered.

Other advantages result from the particular arrangement of parts in the present transmission. Inasmuch as the torque converter is not directly connected to the drive shaft 10 but is connected through a clutch, it is possible to tow the car without turning the engine since the clutch may be disconnected. In addition, since the anti-creep brake is supplied with fluid pressure from the front pump 57, the brake is automatically released when the engine is not running and the car is being towed, thus eliminating possible wear upon the brake. Furthermore, it is possible to start the engine by towing or pushing the vehicle in either high or intermediate speed ratios. During towing or pushing, the rear pump driven by the rear pump drive pinion 53 is operated to apply the necessary clutches and brakes, and since there is no overruning in either intermediate or high speed ratios the engine will be rotated. A stalled engine can thus be readily started.

It will be understood that the invention is not to be limited to the exact construction shown and described, but that various changes and modifications may be made without departing from the spirit and scope of the invention, as defined in the appended claims.

What is claimed is:

1. In a variable speed power transmission, in combination, a power shaft, an intermediate shaft and a load shaft, a torque converter having an impeller, a turbine and a reactor, a friction clutch for selectively coupling said impeller to said power shaft, means connecting said turbine to said intermediate shaft, a multiple planetary gearing system comprising a planet carrier rotatably supported about the axis of said intermediate shaft and operatively connected to the reactor of said torque converter, a plurality of planet pinions rotatably supported upon said planet carrier, sun gears meshing with said planet pinions, one of said sun gears being operatively connected to said load shaft to transmit power thereto, and selectively operable brake nished to provide for smooth shifting of the transmission.

A control system suitable for the present transmission may also incorporate means for modulating the governor control, of the type shown in the copending application of Eugene J. Farkas, Serial No. 637,846, filed December 29, 1945, entitled "Automatic Transmission." This is accomplished by utilizing the modulated fluid pressure, obtained as mentioned above, and by introducing this variable pressure into a chamber at one end of the governor sleeve valve to oppose axial movement of the valve by the centrifugal weights. Since the pressure varies directly with the load or torque, less resistance to axial movement of the sleeve valve is thus afforded when the transmission is operated under light load conditions, resulting in the transmission being shifted to the next higher speed ratio at a relatively low speed. When the load or torque is greater, however, movement of the sleeve valve is opposed by a correspondingly greater fluid pressure, and the shift is retarded, taking place at a higher speed. This imparts flexibility to the control system, and greatly improves the performance of the vehicle by retarding the shift to a higher speed ratio under heavy torque conditions and advancing the shift under light torque conditions.

Operation

Referring now to Figure 1, in low speed operation the low speed clutch and the forward speed brake 45 are applied. Power is then transmitted from the drive shaft 10 and flywheel 13 through the cushioned spring drive assembly 14 to the annular housing 15 and thence through the low speed clutch 19, 20 to the impeller 16 of the torque converter. The resulting rotation of the turbine 17 of the torque converter is transmitted directly to the main shaft 11 and through the low speed gear reduction effected by sun gear 42, planet pinions 38 and 39 and sun gear 43 to the load shaft 12, driving the latter in the forward direction. Inasmuch as it is an inherent characteristic of a torque converter to provide a continuously variable reduction over a given range, it will be seen that the variable reduction of the torque converter and the fixed reduction of the planetary system in low combine to produce a continuously variable low speed range. The limits of this range are such that they include the usual two lowest speed ratios provided in a four speed transmission, and consequently the present transmission can be considered the full equivalent of a four speed transmission.

Figure 2:
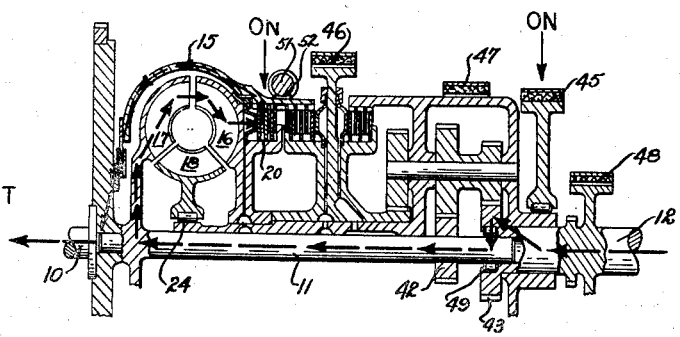
Figure 2 is a cross sectional view similar to a portion of Figure 1 but illustrating the power flow through the transmission when the vehicle is coasting in the low speed range.
Figure 3:
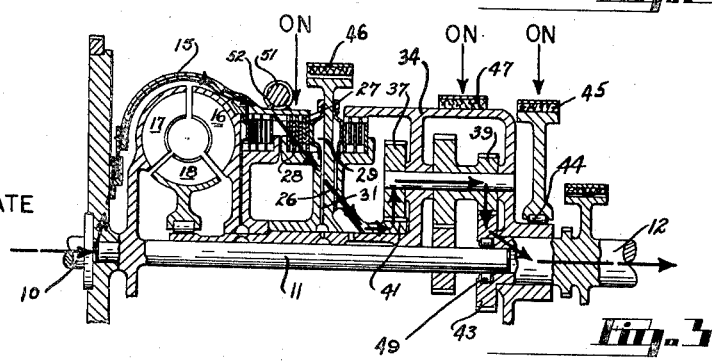

Figure 2 illustrates the reverse flow of power through the transmission when the load shaft tends to overrun the drive shaft as in coasting. The overrunning clutch 49 between the main shaft 11 and the load shaft 12 allows the main shaft to overrun the load shaft in the forward drive direction, but since the load shaft is prevented from overrunning the main shaft it follows that a direct drive is effected through the transmission when the speed of the coasting load shaft reaches the speed of the main shaft. The engine is thus driven in direct drive ratio through the torque converter, which then acts as a fluid coupling, and engine stalling in the low speed range is prevented.

The shift from low speed range to intermediate speed is effected by applying the intermediate speed clutch 27, 28 and simultaneously releasing the low speed clutch 19, 20. The foregoing constitutes the only "timed" shift necessary with the present transmission, since in all other clutch sequences there is a time interval or lag which eliminates the difficulties inherent in properly controlling timed shifts. After the intermediate speed clutch 27, 28 has been applied, the lock-up or downhill brake 47 is engaged to overrule the overrunning clutch 44 and to prevent free wheeling in intermediate speed. The brake 47 need not be applied simultaneously with the intermediate speed clutch, but can be applied at any convenient interval thereafter, thus simplifying the controls. With the low speed clutch 19, 20 disengaged, the impeller 16 of the torque converter is disconnected from the annular drive housing 15, and no power is transmitted through the converter. Instead, the power flow is from the housing 15 through the intermediate speed clutch 27, 28 to the clutch carrier 26, and through the intermediate speed gear reduction comprising the sun gear 41, planet pinions 37 and 39, and sun gear 43 to the load shaft 12 to drive the latter in the intermediate speed ratio.

Reference is now made to Figure 4 which illustrates the transmission in the high speed ratio. This transition is effected by first releasing the lock-up brake 47 and subsequently, after a definite time lag, engaging the high speed clutch 32, 33. Since the intermediate speed clutch 27, 28 is still engaged, the clutch carrier 26, the planet carrier 34 and the triple planetary pinions are rotated as a unit establishing a direct drive from the drive shaft 10 to the load shaft 12. Again, a timed shift is not necessary, since the lock-up brake 47 can be released prior to application of the high speed clutch.

The power flow in reverse is shown in Figure 5. The transmission is placed in reverse by applying the low speed clutch 19, 20 and the reverse speed brake 46. With the low speed clutch applied, the power flow is again through the torque converter to the main shaft 11, and since the clutch carrier 26 and sun gear 41 are locked against rotation by the reverse speed brake 46, power is transmitted through the planetary system in the reverse direction, the power flow being at the low speed ratio afforded by the sun gear 42, planet pinions 38 and 39, and sun gear 43 to drive the load shaft 12 in the reverse direction at low speed ratio.

It will be seen from the foregoing that the torque converter is utilized only in low and reverse, and is released from the power train in intermediate and high speed ratios by disengagement of the low speed clutch 19, 20. Thus the advantages of a torque converter are utilized to the fullest extent without entering the inefficient range of the converter. The fluid drive in low and reverse provides continuously variable and smooth acceleration, and the 100% mechanical drive in intermediate and high speed ratios yields a high efficiency and fuel economy. Another advantage derived from this arrangement is the fact that since overall torque converter efficiency is not as important since the converter is used only in low and reverse, the vaneing design of the converter can be modified somewhat to obtain a lower cost of production of the converter.

The present invention eliminates free wheeling in all speed ranges. In high speed a direct mechanical drive is provided, whereas in intermediate speed the lock-up brake 47 overrules the overrunning clutch 44 and enables the engine to friction means arranged to lock said planet carrier against rotation to establish one speed ratio.

2. In a variable speed power transmission, in combination, a power shaft, an intermediate shaft and a load shaft, a torque converter having an impeller, a turbine and a reactor for transmitting power from said power shaft to said intermediate shaft, a clutch carrier mounted for rotation about the axis of said intermediate shaft, a planet carrier mounted for rotation about the axis of said intermediate shaft, means connecting said impeller to said power shaft, means connecting said turbine to said intermediate shaft, an overrunning clutch connecting said reactor to said planet carrier, a friction clutch selectively operable to connect said drive shaft to said clutch carrier, a second friction clutch selectively operable to connect said clutch carrier to said planet carrier, a plurality of planet pinions rotatably mounted upon said planet carrier, and sun gears meshing with said planet pinions, one of said sun gears being operatively connected to said load shaft to transmit power from said intermediate shaft to said load shaft.

3. In a variable speed power transmission, in combination, a power shaft, an intermediate shaft and a load shaft, a torque converter having an impeller, a turbine and a reactor, a friction clutch for selectively connecting said power shaft to said impeller, means connecting said turbine to said intermediate shaft, a clutch carrier and a planet carrier mounted for rotation about the axis of said intermediate shaft, an overrunning clutch connecting said reactor to said planet carrier, a second friction clutch for selectively connecting said power shaft to said clutch carrier, a third friction clutch for selectively connecting said clutch carrier to said planet carrier, a brake, an overruning clutch between said brake and said planet carrier preventing reverse rotation of said planet carrier, a plurality of planet pinions carried by said planet carrier, and a plurality of sun gears respectively supported upon said clutch carrier, said intermediate shaft and said load shaft and meshing with said planet pinions respectively to transmit power from said power shaft to said load shaft.

CLYDE R. PATON.

REFERENCES CITED

The following references are of record in the file of this patent:

UNITED STATES PATENTS

| Number | Name | Date |
|---|---|---|
| 1,316,740 | Reeve | Sept. 23, 1919 |
| 2,093,236 | Dodge | Sept. 14, 1937 |
| 2,196,585 | Gette | Apr. 9, 1940 |
| 2,272,320 | Freeman | Feb. 10, 1942 |
| 2,277,214 | Dodge | Mar. 24, 1942 |
| 2,298,648 | Russell | Oct. 3, 1942 |
| 2,328,684 | Schnell | Sept. 7, 1943 |
| 2,371,574 | Swennes | Mar. 13, 1945 |
| 2,457,729 | Roberts | Dec. 28, 1948 |